(12) United States Patent
Campbell

(10) Patent No.: US 10,639,909 B1
(45) Date of Patent: May 5, 2020

(54) SYSTEM AND METHOD FOR PRINTING ON THREE-DIMENSIONAL OBJECTS WITH ULTRAVIOLET CURABLE INKS IN A DIRECT-TO-OBJECT PRINTER

(71) Applicant: Xerox Corporation, Norwalk, CT (US)

(72) Inventor: Richard A. Campbell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/163,731

(22) Filed: Oct. 18, 2018

(51) Int. Cl.
*B41J 29/38* (2006.01)
*B41J 3/407* (2006.01)
*B41J 25/304* (2006.01)

(52) U.S. Cl.
CPC ........... *B41J 3/4073* (2013.01); *B41J 25/304* (2013.01)

(58) Field of Classification Search
USPC .............................................................. 347/6
See application file for complete search history.

(56) References Cited

U.S. PATENT DOCUMENTS

| 7,520,602 | B2 | 4/2009 | Codos |
| 8,123,346 | B2 | 2/2012 | Ohnishi et al. |
| 2001/0038408 | A1 | 11/2001 | Codos et al. |
| 2007/0286963 | A1 | 12/2007 | Rocha-Alvarez et al. |
| 2011/0199409 | A1* | 8/2011 | Lee .............. B41J 3/28 347/9 |

* cited by examiner

*Primary Examiner* — Lam S Nguyen
(74) *Attorney, Agent, or Firm* — Maginot Moore & Beck LLP

(57) ABSTRACT

A direct-to-object printer includes a sliding arm that carries a plurality of printheads over a planar member for the printing of objects on the planar member and that rotates the plurality of printheads after the printheads have passed over the planar member. The printer then moves the sliding arm in the opposite direction over the planar member to print a different portion of the objects on the planar member while maintaining the same order of the printheads.

14 Claims, 15 Drawing Sheets

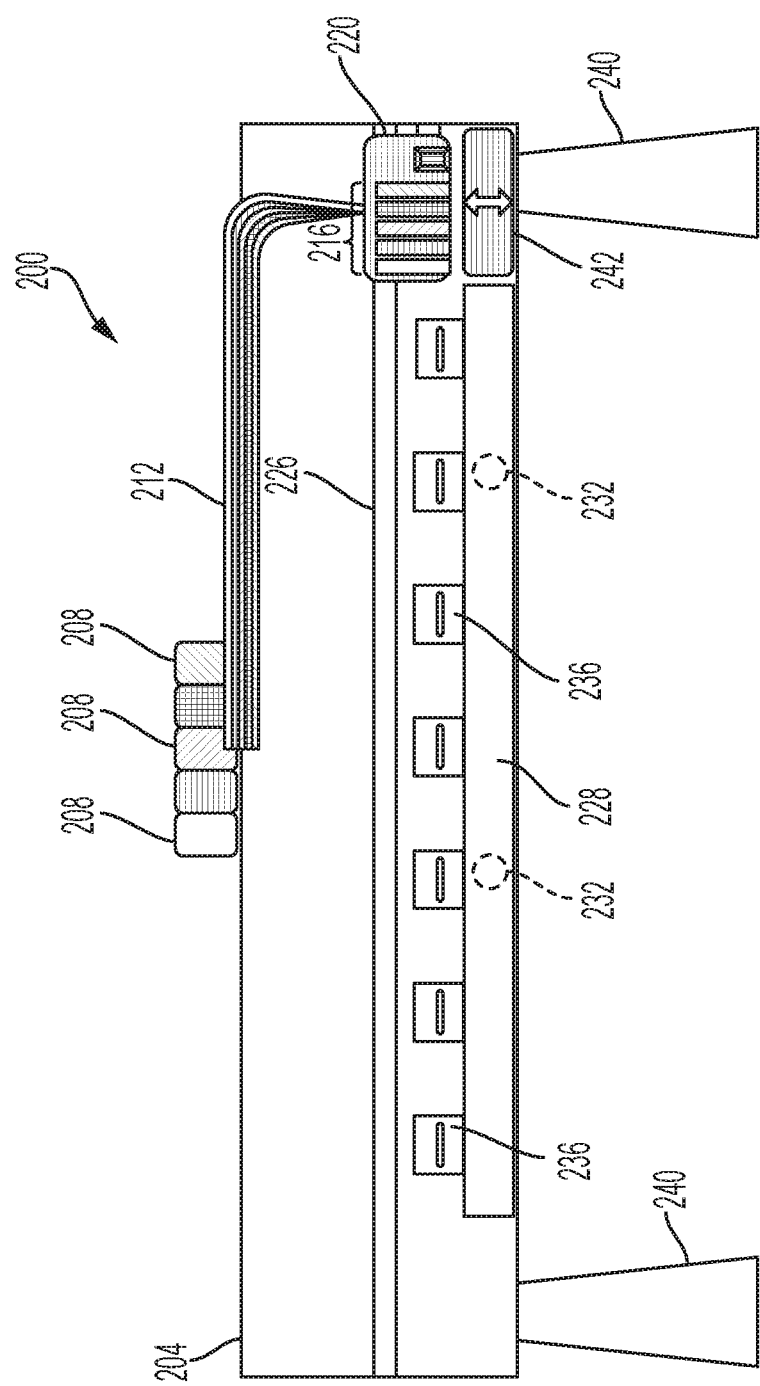

SYSTEM AND METHOD FOR PRINTING ON THREE-DIMENSIONAL OBJECTS WITH ULTRAVIOLET CURABLE INKS IN A DIRECT-TO-OBJECT PRINTER

TECHNICAL FIELD

This disclosure relates generally to a system for printing on three-dimensional (3D) objects, and more particularly, to systems that print ultraviolet curable inks on objects.

BACKGROUND

Printers known as direct-to-object (DTO) printers have been developed for printing onto three-dimensional (3D) objects. FIG. 4A depicts a prior art printing system 100 configured to print the surface of an object 104 mounted to a holder 108 as the holder 108 moves on a member 116 past an array 112 of fixed printheads 118. As used in this document, the term "fixed printhead" refers to printheads in a printer that are immobile and their faceplates remain parallel with the plane of the object holder throughout the printing of the object secured by the holder. One or more of the printheads 118 in the array 112 ejects ultraviolet (UV) ink onto the object and the UV lamp 120 is operated by controller 124 to cure the UV ink. The printheads are arranged so the object passes the white printhead first, the cyan color printhead second, the black printhead third, and the magenta printhead fourth. Although the colors can be arranged in other sequences, white typically leads the other colors to provide a background for the other colors. The controller 124 is configured to operate the actuator 128 to move the holder 108 after the object is mounted into the holder. The holder 108 can also be configured with an actuator that the controller operates to rotate the object in the holder. A first sector of the circumference of the object is printed in a first pass by the printheads, cured by the UV lamp 120, rotated to present a different sector of the object as the holder passes the printheads so the new sector can be printed, and then the holder and object are returned to a position opposite the UV lamp 120 so the ink on the newly printed sector can be cured. Alternatively, a second UV lamp can be added below the cyan printhead to cure the UV ink ejected onto the object when the holder moves in the direction of the white printhead to the cyan printhead. Controller 124 is configured to operate the printheads in the array 112 to eject marking material onto the surface of the object 104 as the holder 108 and the object 104 pass the printheads. FIG. 4B depicts the holder 108 and the object 104 as they face the printhead array 112. Latches 132 attach the holder 108 to the member 116.

The architecture of the system 100 requires multiple passes by the printhead array 112 with the object being returned for curing by the UV lamp 120 after each pass so the UV ink can be dried before another pass is performed. Alternatively, an additional UV lamp is required and this addition necessitates additional expense. Moreover, the system 100 is limited to printing images on one object and the images are printed one sector at a time. Therefore, a direct-to-object printing system that enables many objects to be printed and cured with a single UV lamp would be beneficial.

SUMMARY

A new direct-to-object (DTO) printing system enables many objects to be printed and cured with a single UV lamp. The printing system includes a guide rail, a member having a first end and a second end, the first end of the member being mounted about the guide rail and configured to slide along the guide rail in a first direction and a second direction, the second direction being opposite to the first direction, and the second end of the member extending perpendicularly from the guide rail, a plurality of printheads mounted to the second end of the member, the printheads in the plurality of printheads having a predetermined order when the first end of the member moves in the first direction along the guide rail and the plurality of printheads are configured to rotate about the second end of the member, a planar member positioned opposite a path that the plurality of printheads follows as the one end of the member moves along the guide rail in the first and the second directions, a plurality of actuators, at least one of the actuators being operatively connected to the first end of the member and at least one of the actuators being operatively connected to the plurality of printheads, and a controller operatively connected to the plurality of printheads and the plurality of actuators. The controller is configured to operate the at least one actuator operatively connected to the first end of the member to move the first end of the member along the guide rail in the first and the second directions and to move the plurality of printheads along the path opposite the planar member, to operate the plurality of printheads to eject drops of ink toward the planar member as the plurality of printheads move along the path opposite the planar member to form images on objects positioned on the planar member, and to operate the at least one actuator operatively connected to the plurality of printheads to rotate the plurality of printheads about the second end of the member to position the printheads in the predetermined order regardless of whether the first end of the member moves in the first direction or the second direction along the guide rail.

A method of operating a DTO printer enables many objects to be printed and cured with a single UV lamp. The method includes operating with a controller at least one actuator operatively connected to a first end of a member mounted about a guide rail to move the first end of the member bidirectionally along the guide rail and to move a plurality of printheads along a path opposite a planar member, operating with the controller the plurality of printheads to eject drops of ink toward the planar member as the plurality of printheads move along the path opposite the planar member to form images on objects positioned on the planar member, and operating with the controller at least one actuator operatively connected to the plurality of printheads to rotate the plurality of printheads about a second end of the member mounted about the guide rail to position the printheads in the predetermined order regardless of which direction the first end of the member moves along the guide rail.

BRIEF DESCRIPTION OF THE DRAWINGS

The foregoing aspects and other features of a printing system that enables many objects to be printed and cured with a single UV lamp are explained in the following description taken in connection with the accompanying drawings.

FIG. 1A is a schematic diagram of a side view of a printing system configured to enable many objects to be printed and cured with a single UV lamp.

DETAILED DESCRIPTION

Figure 1B:
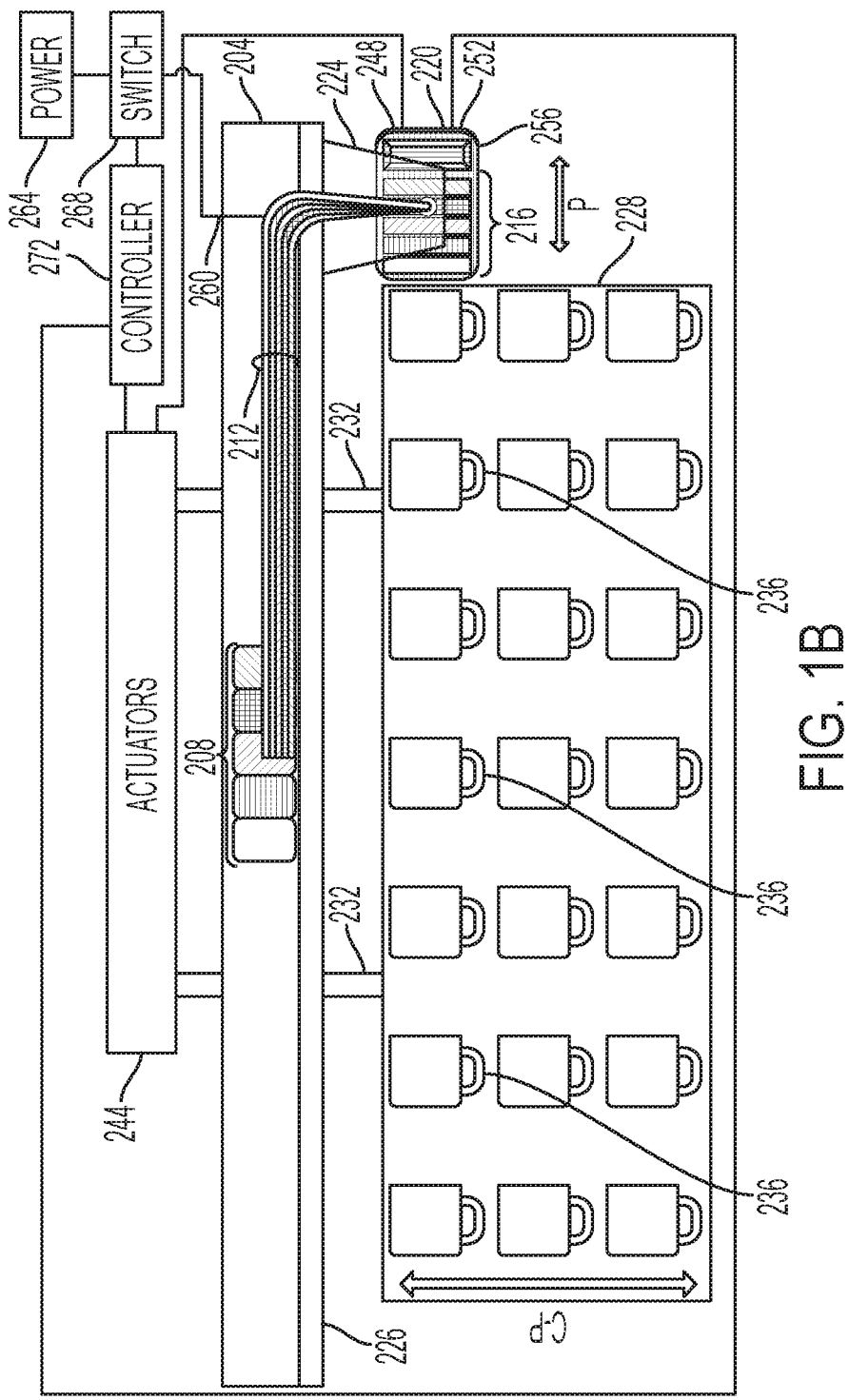
FIG. 1B is a schematic diagram of a top view of the printing system of FIG. 1A.

For a general understanding of the present embodiments, reference is made to the drawings. In the drawings, like reference numerals have been used throughout to designate like elements.

A side view of a printing system 200 that enables printing of multiple objects and curing of the ink with a UV lamp is shown in FIG. 1A. The system includes a frame 204 that supports a plurality of ink reservoirs 208 that are connected by ink conduits 212 to printheads 216. Printheads 216 are mounted to a bracket 220 at one end of an arm 224 (FIG. 1B) that extends from the frame 204. The arm 224 is configured to slide along guide rail 226 to enable the bracket 220 carrying the printheads 216 over a planar member 228 that is mounted to a pair of shafts 232. The shafts 232 extend through the frame 204 in a manner discussed with reference to FIG. 1B below. Workpieces 236 are positioned on the planar member 228 for printing. Support members 240 extend from frame 204 to enable the system 200 to stand on a floor or other planar support surface. A printhead maintenance unit 242 is positioned opposite the home position for the printheads.

In the top view of the system 200 shown in FIG. 1B, the ends of the shafts 232 are operatively connected to actuators 244 to slide the shafts bidirectionally through support sleeves (not shown) that are mounted to the underside of frame 204. In this manner, the planar member 228 moves perpendicularly to the movement of the bracket 220 and the printheads 216 in the process direction P along the guide rail 226. The bidirectional movement of the planar member 228 is called the cross-process (C-P) direction in this document and the bidirectional movement of the bracket 220 and the printheads 216 along the guide rail 226 is called the process direction (P) in this document. The coordination of the movements in these two directions are discussed more fully below in the operation of the system 200. The ink conduits 212 pass through an aperture 248 in the bracket 220 before mating with the respective printheads 216 to supply ink to the printheads. The ink conduits 212 connect the ink reservoirs 208 to the printheads 216 in a one-to-one correspondence. The order of the printheads and the ink reservoirs shown in the figures are useful for printing some images but other arrangements are useful for other images and can be accommodated in other embodiments of the system 200. The bracket 220 is mounted to pivot about pin 252 that holds the bracket 220 to the arm 224. One of the actuators 244 is operatively connected to the bracket 220 to pivot the bracket about the pin 252. Also mounted to the bracket 220 is a UV lamp 256. An electrical conductor 260 also passes through aperture 248 to connect electrically the UV lamp 256 to an electrical power source 264 through a switch 268. A controller 272 is operatively connected to the actuators 244 and the switch 268 to operate the actuators and the switch selectively to move the bracket 220 along the guide rail 226, move the shafts 232 connected to the planar member 228, rotate the bracket 220 about the pin 252, and energize the UV lamp 256. The controller 272 is also operatively connected to the printheads 216 to operate the ejectors in the printheads with reference to image data stored in a memory connected to the controller to form images on objects on the planar member 228. Maintenance unit 242 is also connected to the controller 272 so the controller can operate the maintenance unit 242 for cleaning and other printhead maintenance.

Figure 2A:
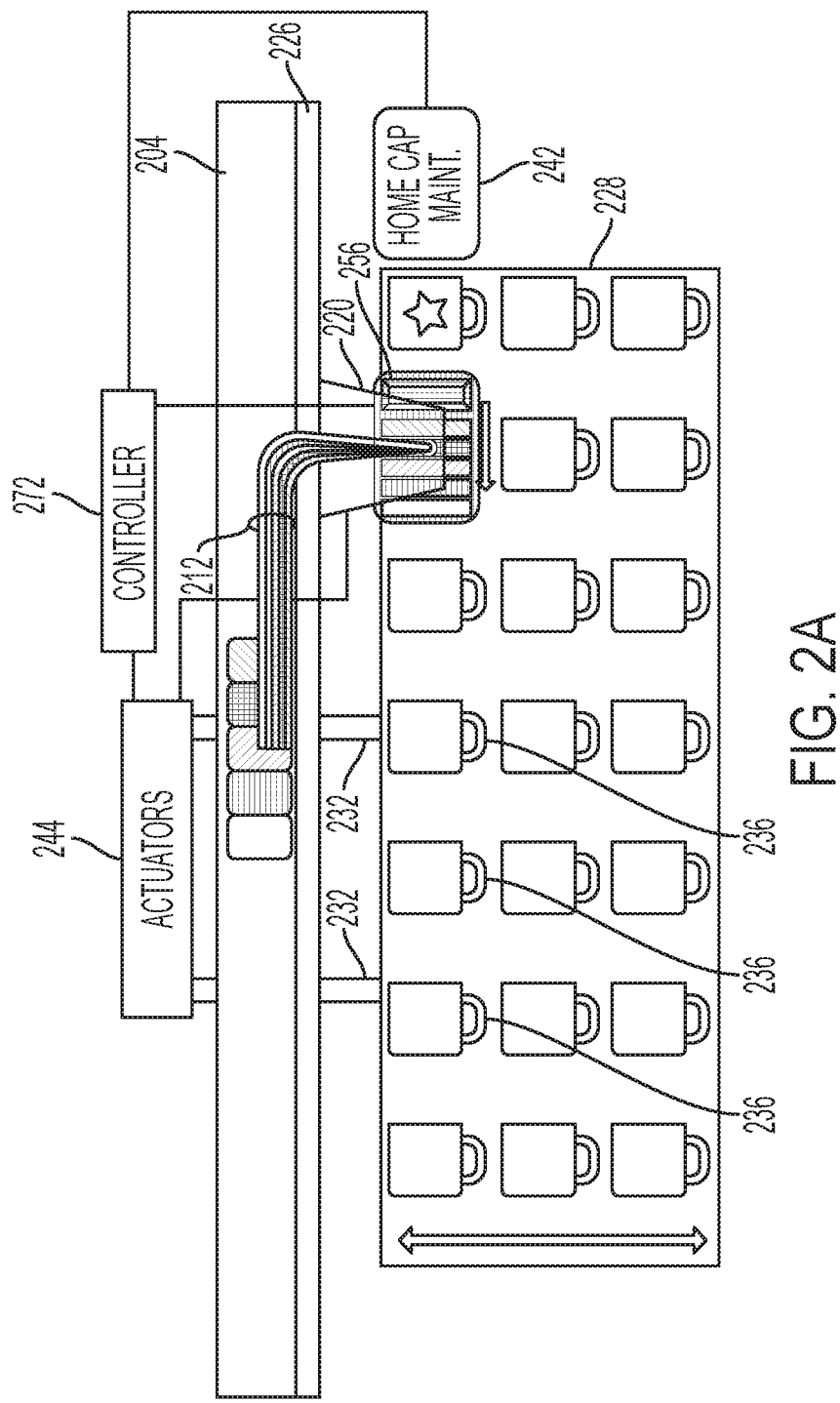
FIG. 2A is a top view depicting the system of FIG. 1B in operation.
Figure 2B:
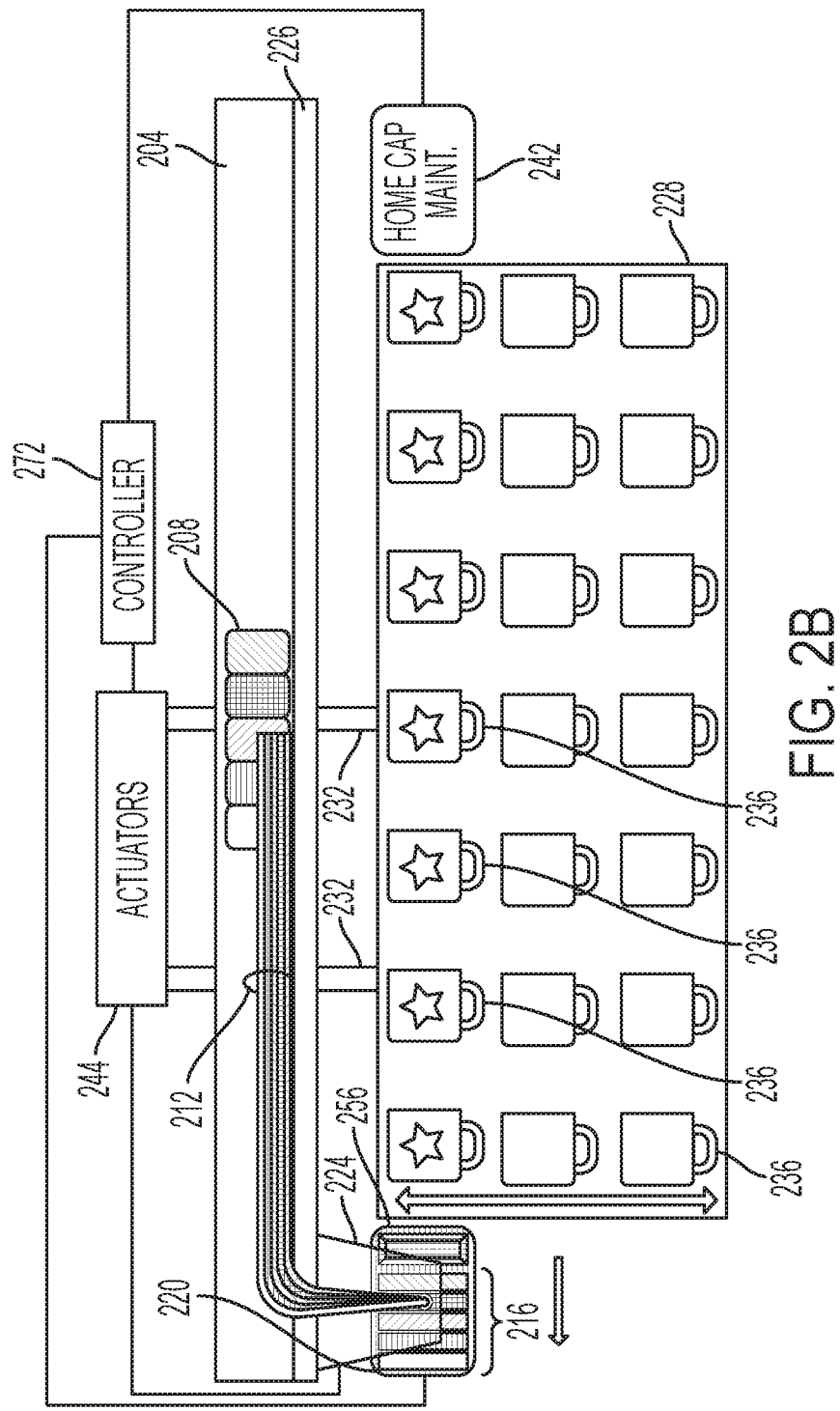
FIG. 2B is a top view depicting the system of FIG. 1B in operation.
Figure 2C:
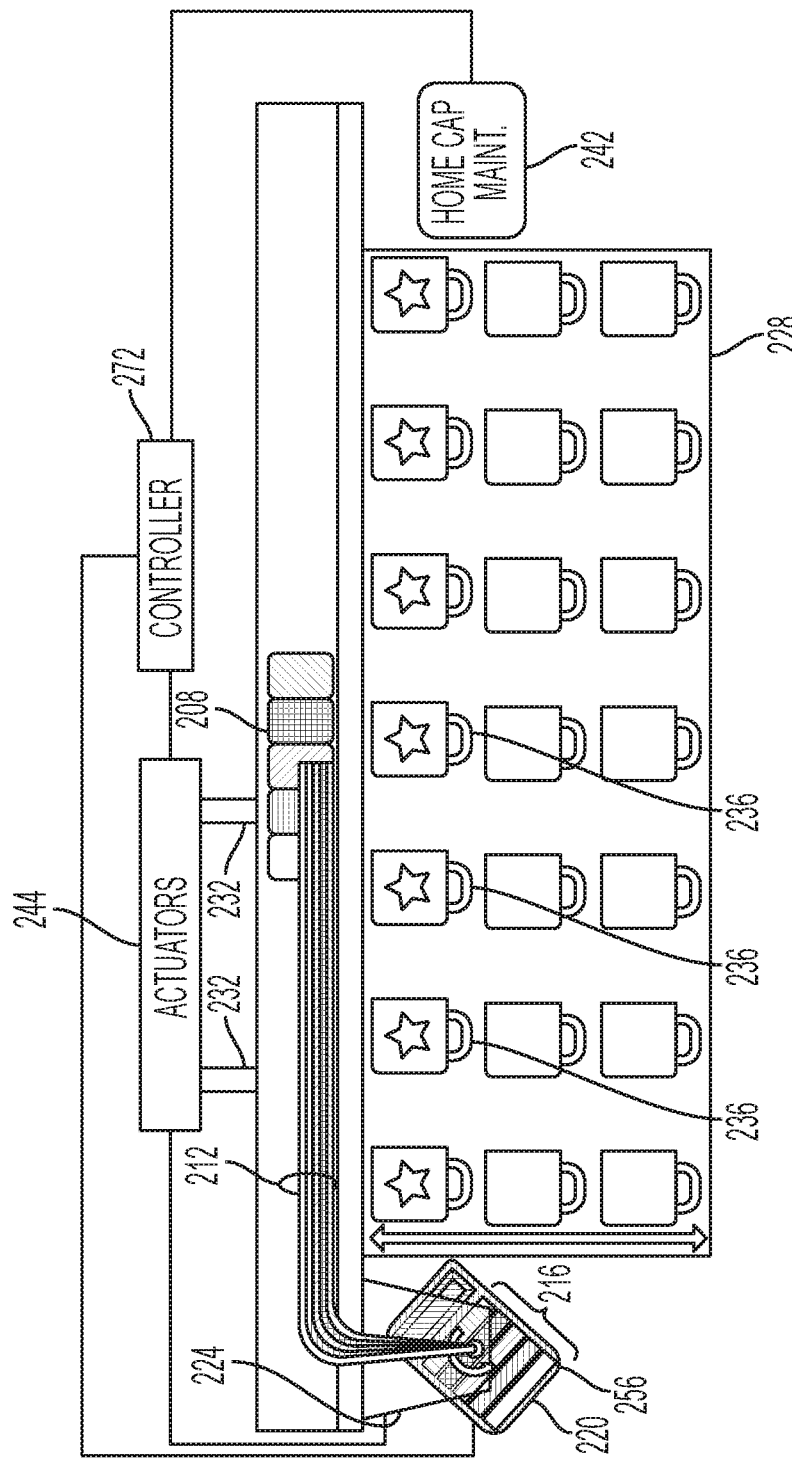
FIG. 2C is a top view depicting the system of FIG. 1B in operation.
Figure 2D:
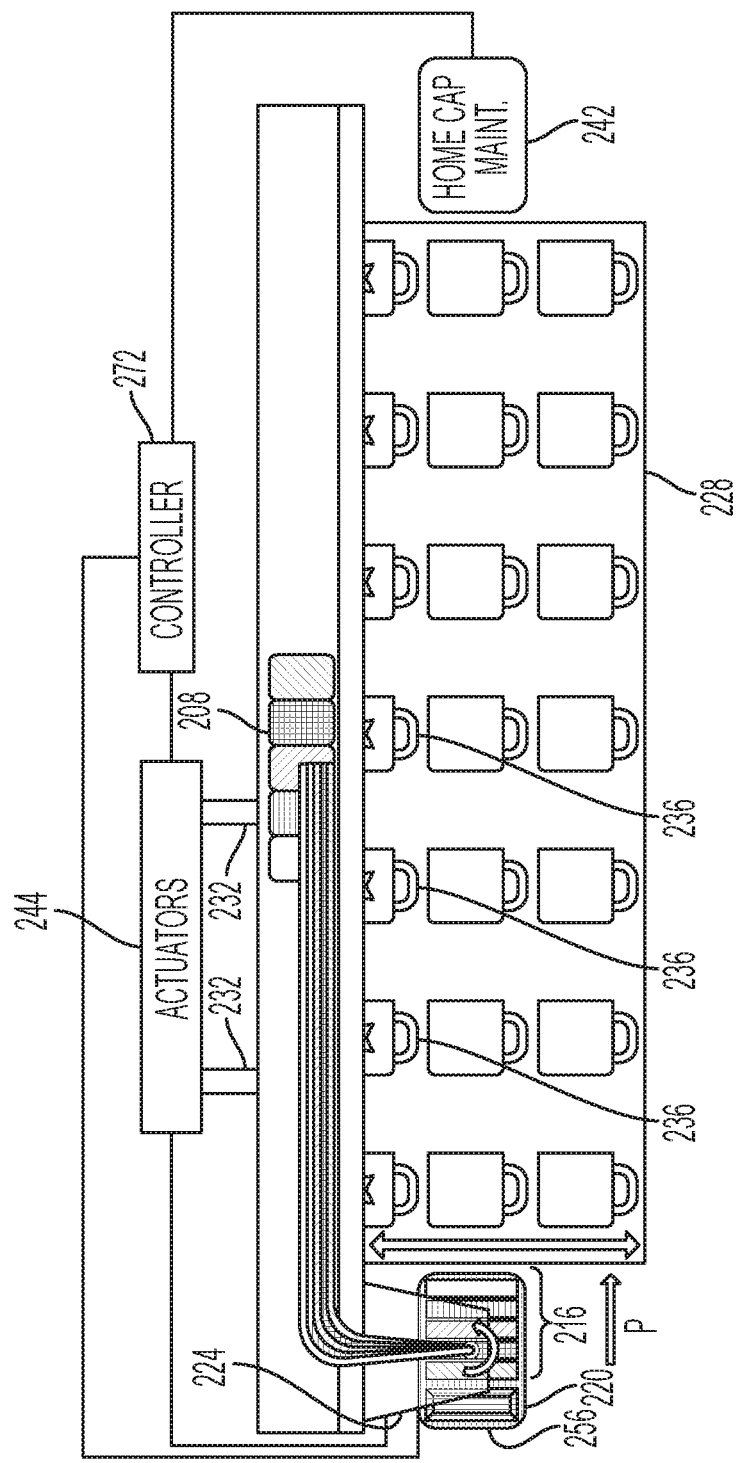
FIG. 2D is a top view depicting the system of FIG. 1B in operation.
Figure 2E:
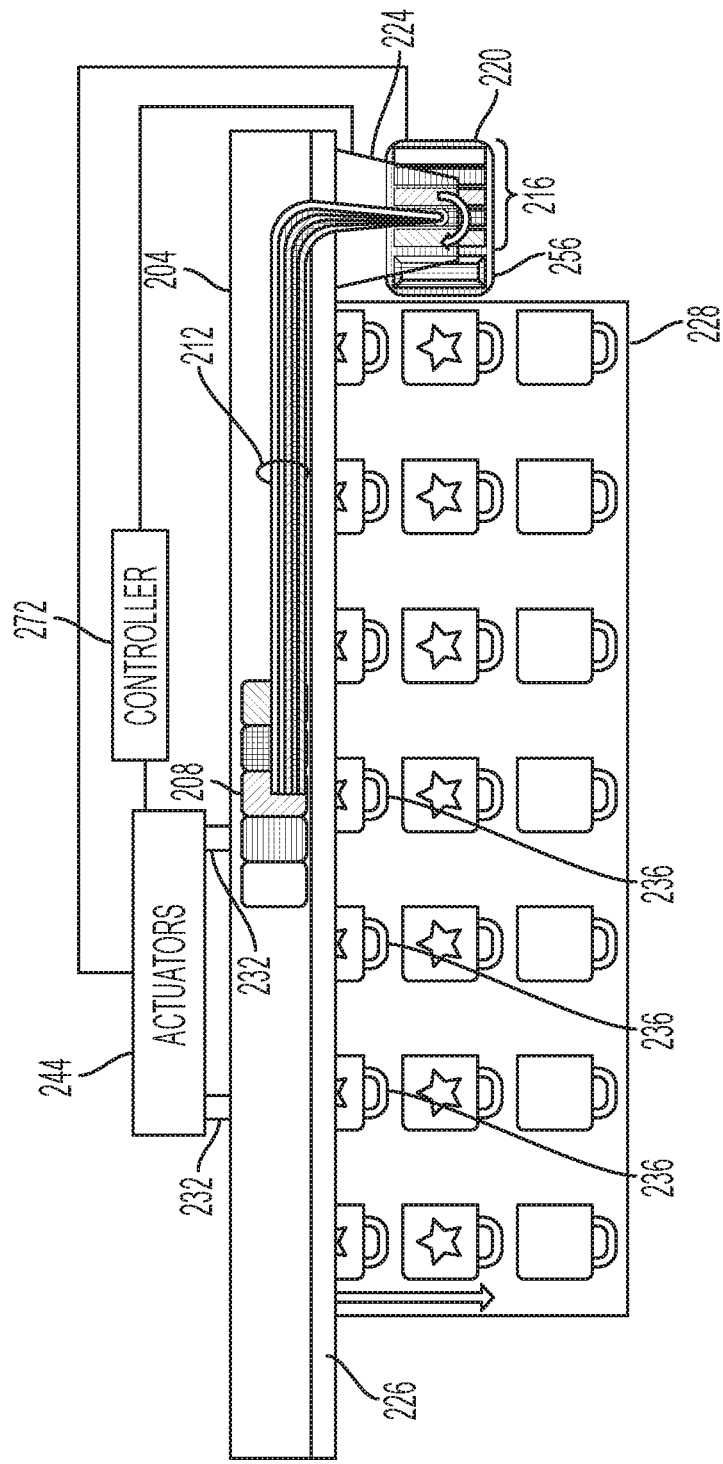
FIG. 2E is a top view depicting the system of FIG. 1B in operation.
Figure 2F:
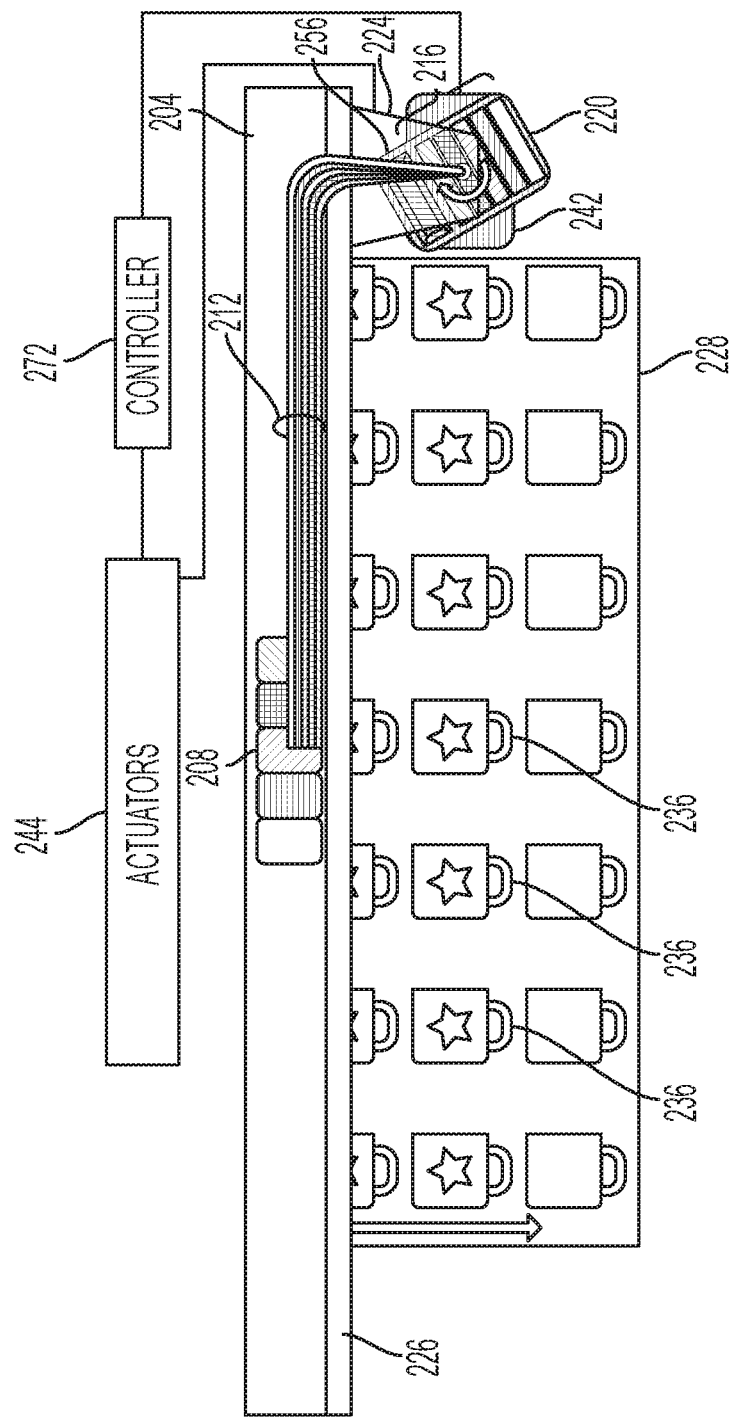
FIG. 2F is a top view depicting the system of FIG. 1B in operation.
Figure 2G:
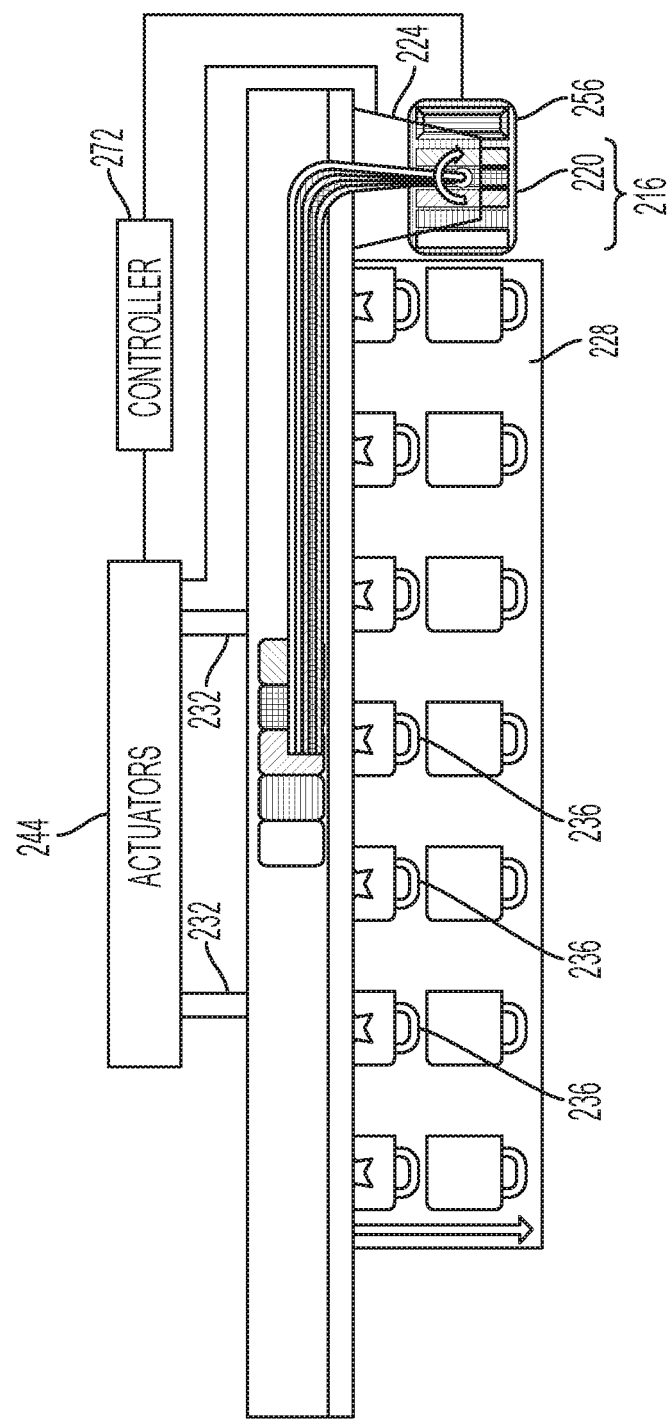
FIG. 2G is a top view depicting the system of FIG. 1B in operation.
Figure 2H:
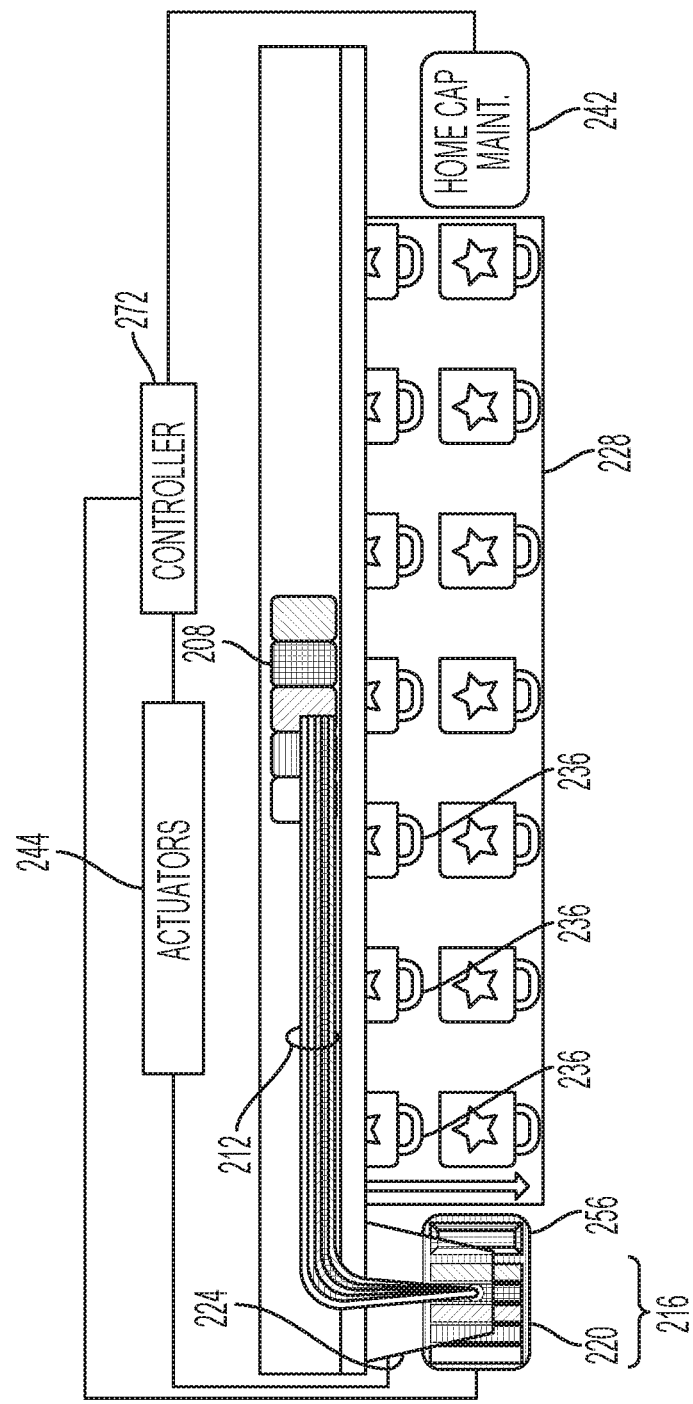
FIG. 2H is a top view depicting the system of FIG. 1B in operation.
Figure 2I:
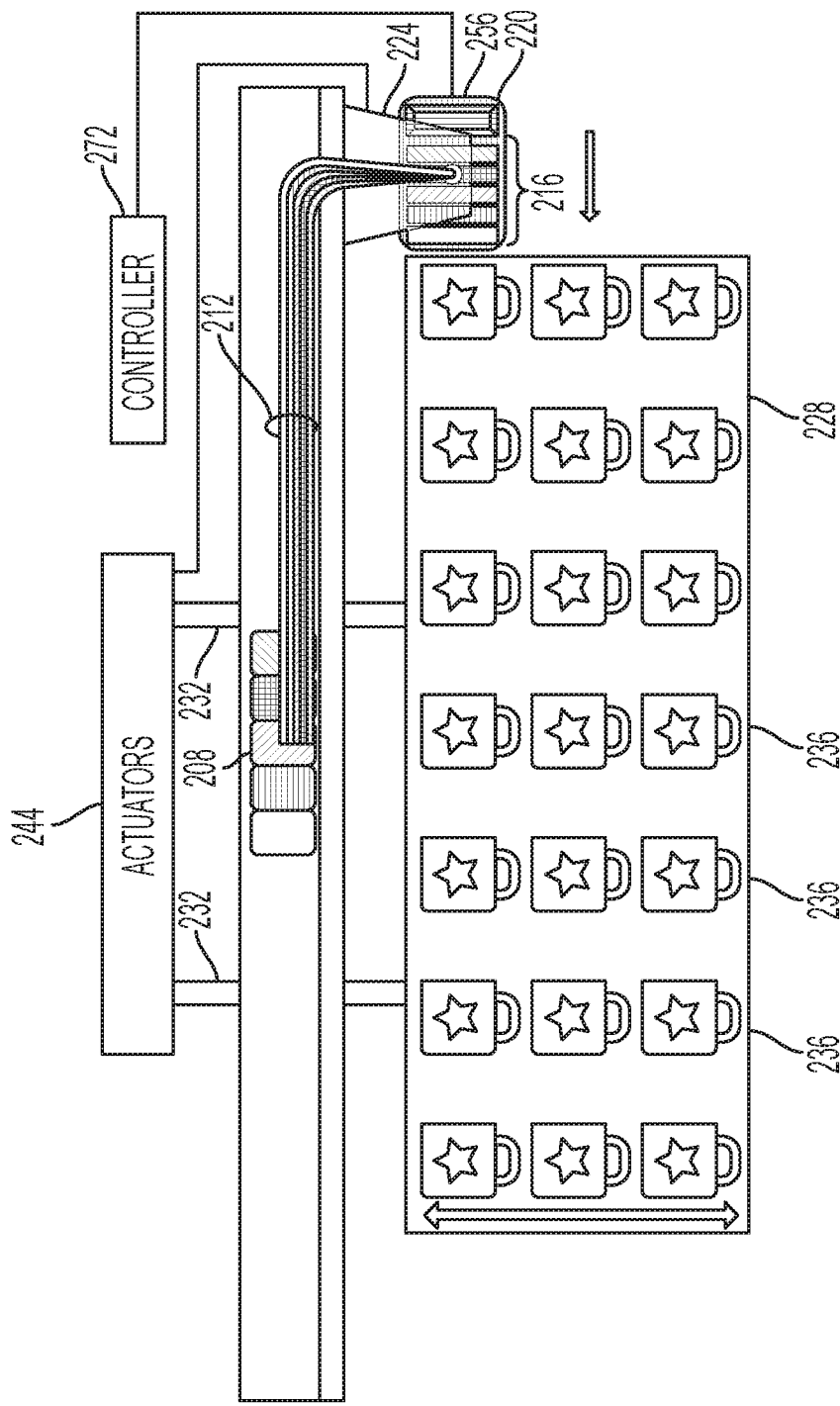
FIG. 2I is a top view depicting the system of FIG. 1B in operation.

In operation, the controller 272 operates the actuators 244 connected to the shafts 232 to move the planar member 228 to its home position where workpieces 236 are positioned on the planar member 228 for printing and the bracket 220 is positioned at its home position as shown in FIG. 1B. The controller 272 then operates the actuator 244 connected to the bracket 220 to move the bracket and the printheads in the process direction and the controller also operates the printheads 216 and the UV lamp 256 to form and cure ink images on a portion of the workpieces 236 on the planar member 228 as shown in FIG. 2A. In FIG. 2A to FIG. 2I, the conductor 260, the switch 268, and the electrical power source 264 have been removed to simplify the figures. After the printheads have traversed the length of the planar member 228 as shown in FIG. 2B, the controller 272 operates the actuators 244 to stop the bracket although the controller can stop the movement of the printheads sooner if workpieces are not positioned along the entire length of the planar member. The controller 272 then operates the actuator 244 connected to the bracket 220 to rotate the bracket in the counterclockwise direction as shown in FIG. 2C, although the bracket could be rotated in the opposite direction. Although the direction of rotation is not important, the bracket must be rotated sufficiently in one direction or the other so the same printhead that led the printheads during the first movement along the guide rail leads the printheads in the return movement as shown in FIG. 2D. The controller 272 also operates the actuators 244 connected to the shafts 232 to move the planar member 228 toward the frame 204. The controller 272 stops the movement of the planar member movement when the next unprinted portions of the workpieces in the cross-process direction are aligned opposite the printheads 216 as shown in FIG. 2D. The controller 272 then operates the actuator 244 connected to the bracket 220 to move the printheads along the guide rail toward the end of the planar member 228 where the home position is located while operating the printheads and UV lamp to form and cure the next portion of the images as shown in FIG. 2E. After the printheads have traversed the length of the planar member 228 as shown in FIG. 2E, the controller 272 operates the actuators 244 to stop the bracket. The controller 272 then operates the actuator 244 connected to the bracket 220 to rotate the bracket in the opposite direction that the bracket was rotated at the other end of the planar member to help ensure that the ink conduits and electrical conductor are not twisted by repetitive rotation in the same direction as shown in FIG. 2F. Again, the bracket is rotated sufficiently so the same printhead that led the printheads during the previous movement along the guide rail leads the printheads in the next movement as shown in FIG. 2G. The controller 272 also operates the actuators 244 connected to the shafts 232 to move the planar member 228 toward the frame 204. The controller 272 stops the movement of the planar member movement when the next unprinted portions of the workpieces in the cross-process direction are aligned opposite the printheads 216 as shown in FIG. 2G. The controller 272 then operates the actuator 244 connected to the bracket 220 to move the printheads along the guide rail to the opposite end of the planar member 228 while operating the printheads 216 to form and cure the last portion of the image on the workpieces as shown in FIG. 2H. The controller 272 then operates the actuators 244 connected to bracket 220 to return the bracket to its home position and rotate the bracket to present the printheads in the same order in which the printheads were positioned at the start of the operation and operates the actuators 244 connected to the shafts 232 to return the planar member to its home position as shown in FIG. 2I.

Figure 3A:
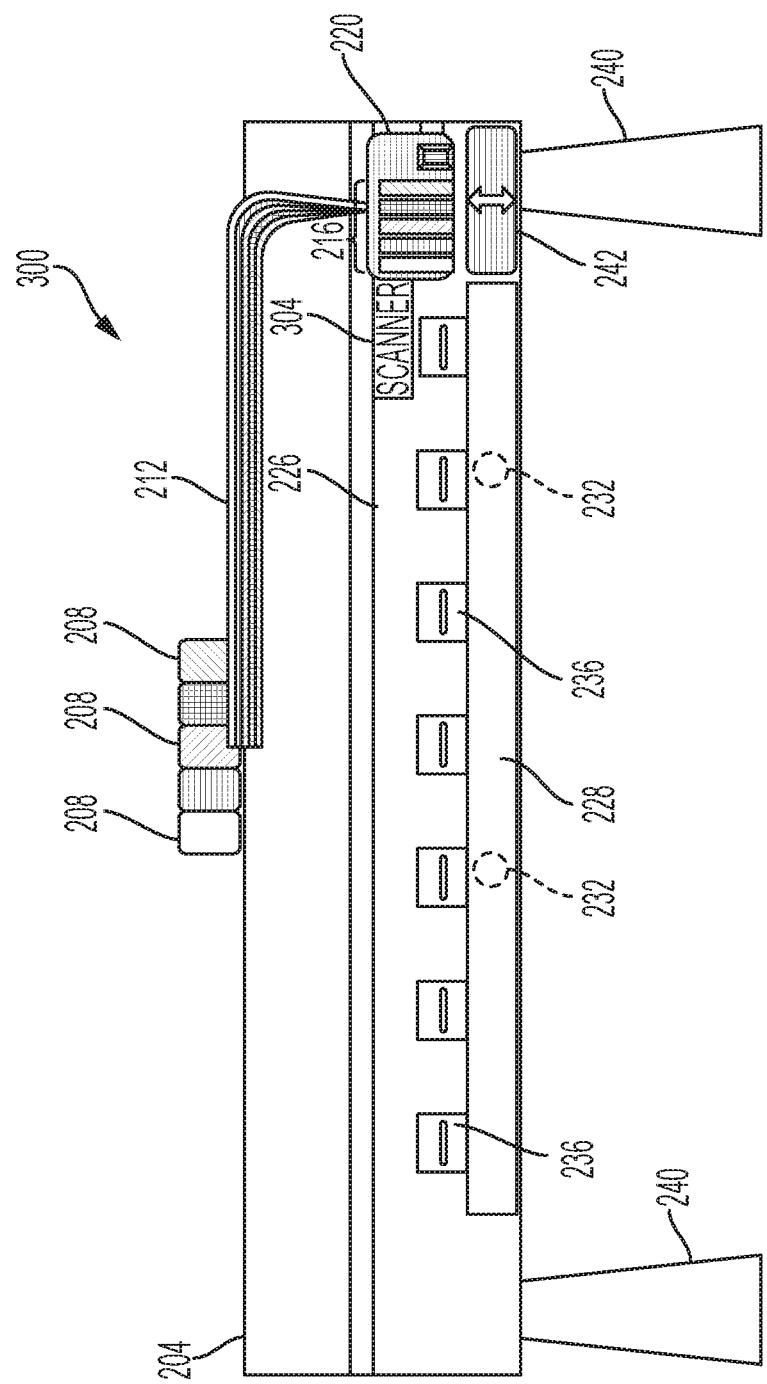
FIG. 3A is a side view of an embodiment of the system shown in FIG. 1A that includes a scanner for imaging the objects to be printed as the printhead moves over the objects.
Figure 3B:
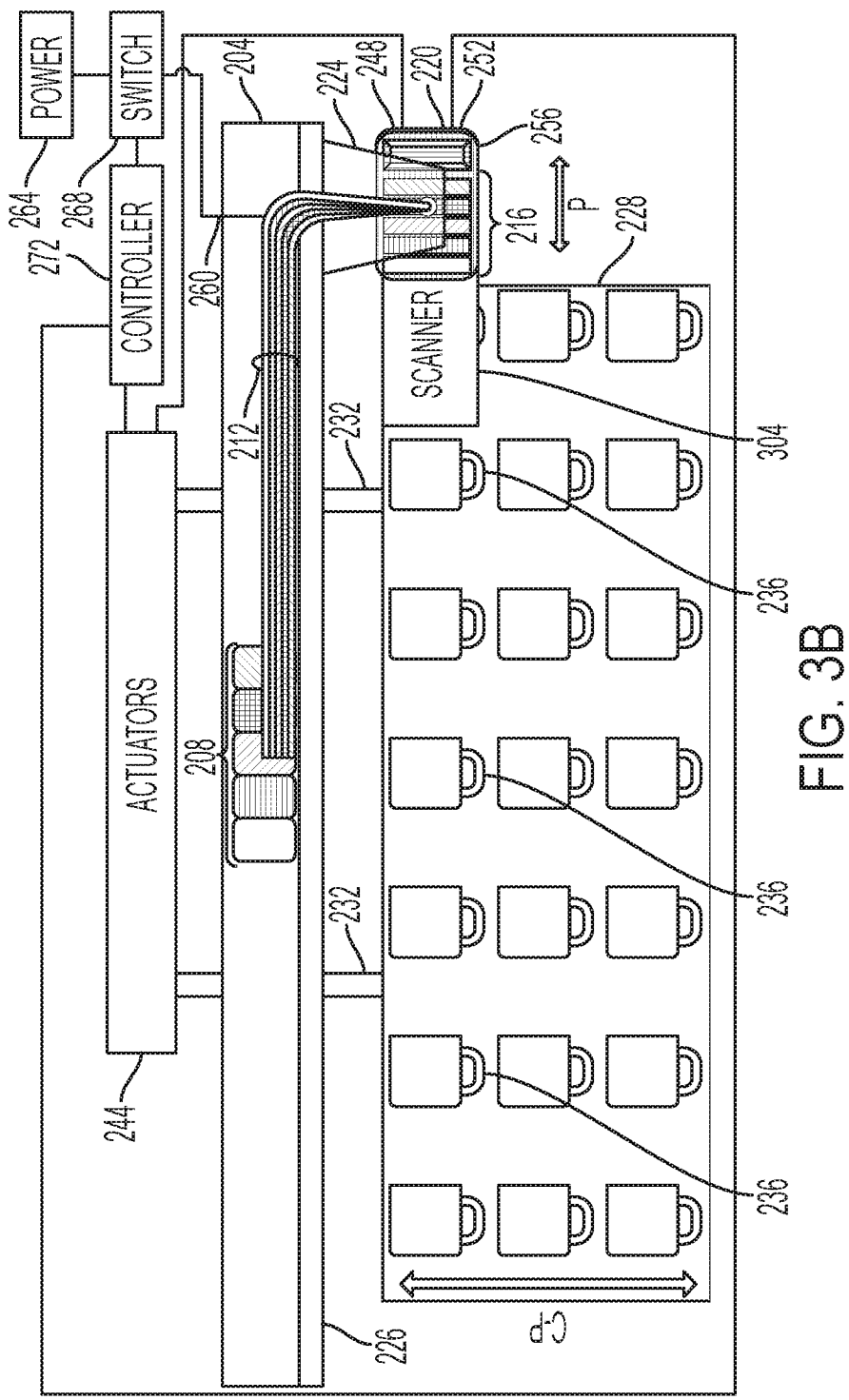
FIG. 3B is a top view of the embodiment shown in FIG. 3B.
Figure 4A:
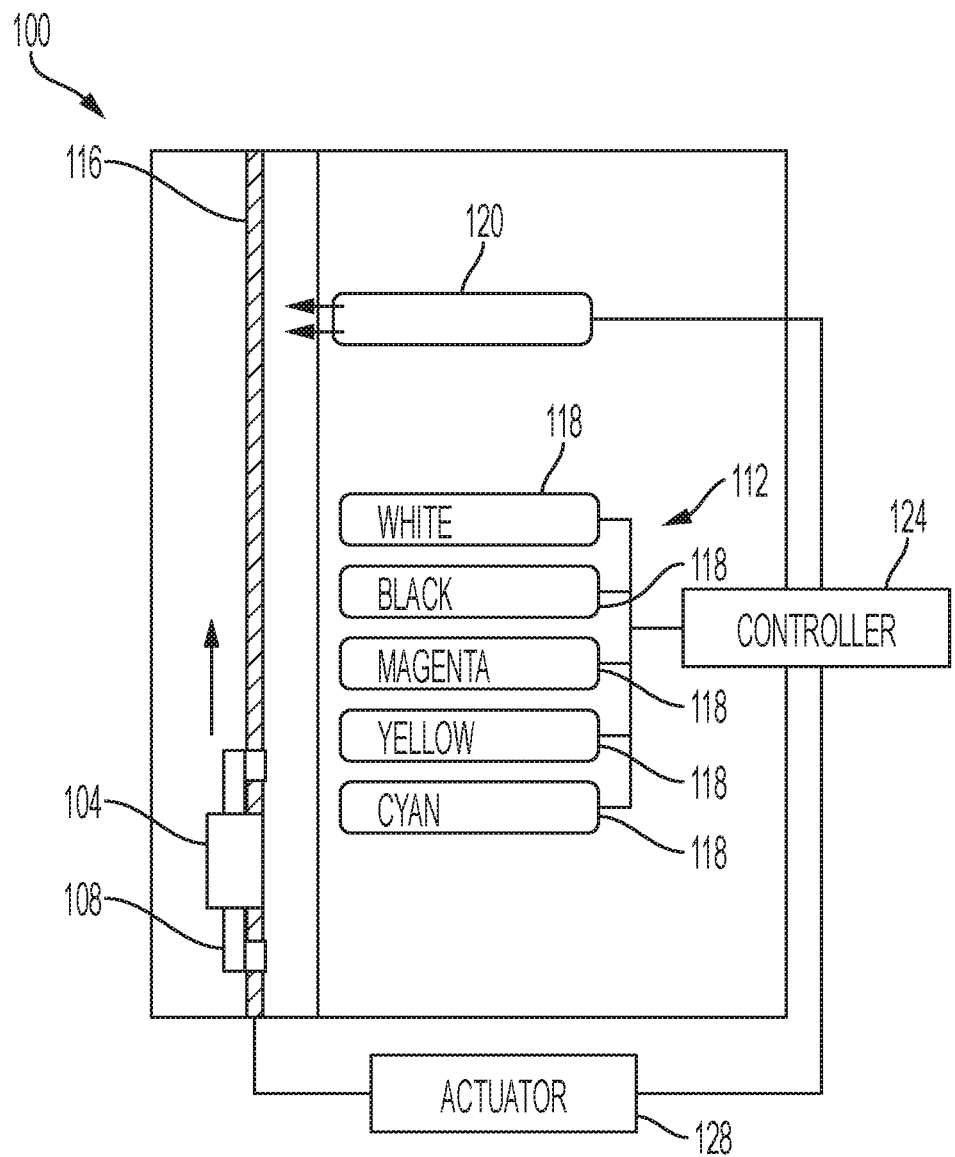
FIG. 4A is a schematic diagram of a prior art DTO printer for forming an ink image on a single object.
Figure 4B:
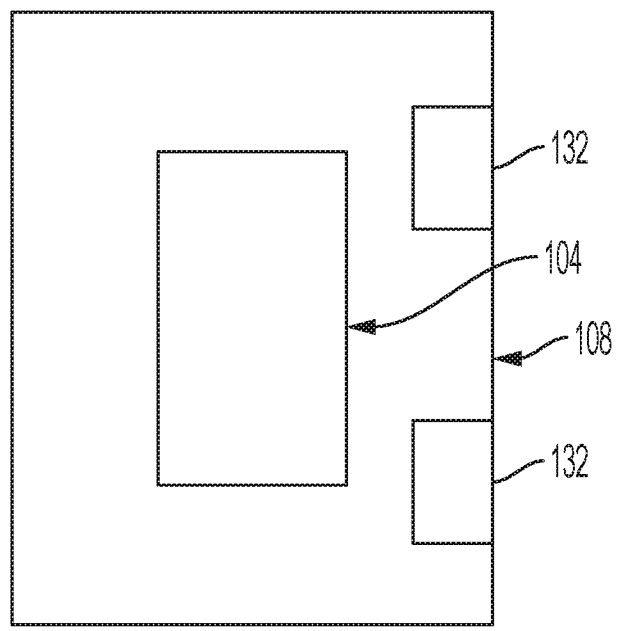
FIG. 4B illustrates a prior art holder that can be used in the printer of FIG. 4A.

In the embodiments described above with reference to FIG. 1A, FIG. 1B, and FIG. 2A to FIG. 2I, the planar member 228 can be formed to be removable from shafts 232 so different planar members can be installed in the system. Each version of the planar member can be formed with recesses that correspond to the outlines of different types of objects to hold the objects during the printing operations of the system. The recesses help hold the objects at predetermined positions so the controller 272 can operate the printheads 216 accurately for printing the images on the objects. Alternatively, the planar member or platform 228 can be formed with holes that are fluidly coupled to a vacuum source so the application of a negative pressure to the holes from the vacuum source can hold the objects to the planar member. The embodiment 300 of FIG. 3A and FIG. 3B includes a scanner 304 that is mounted to one end of the bracket 220 so it always leads the printheads 216. The scanner 304 generates image data of the planar member 228 and the objects 236 and this image data is provided to the controller 272. The controller 272 processes this image data to identify the positions of the objects and these identified positions are used by the controller to operate the printheads to print images on the objects.

The description of the operation of the system 200 and the figures demonstrate how the system enables the printing of multiple objects, the curing of image portions with a single UV lamp, and positions the same printhead as the lead printhead for each pass. Thus, the system saves expenses associated with an additional UV lamp, speeds the printing of the objects, and simplifies the printing process.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:
1. A printing system comprising:
a guide rail;
an elongated member having a first end and a second end, the first end of the elongated member being mounted about the guide rail and configured to slide along the guide rail in a first direction and a second direction, the second direction being opposite to the first direction, and the second end of the elongated member extending perpendicularly from the guide rail;
a plurality of printheads mounted to the second end of the elongated member, the printheads in the plurality of printheads having a predetermined order when the first end of the elongated member moves in the first direction along the guide rail and the plurality of printheads are configured to rotate about the second end of the elongated member;
a planar member positioned opposite a path that the plurality of printheads follows as the one end of the elongated member moves along the guide rail in the first and the second directions;
a plurality of actuators, at least one of the actuators being operatively connected to the first end of the elongated member and at least one of the actuators being operatively connected to the plurality of printheads;
a bracket connected to the second end of the elongated member, the bracket being configured to rotate about a pin connecting the bracket to the second end of the elongated member, the plurality of printheads being mounted to the bracket, wherein the at least one actuator operatively connected to the plurality of printheads is operatively connected to the bracket to rotate the bracket and the plurality of printheads about the pin;
an ultraviolet (UV) lamp mounted to the bracket and positioned in the predetermined order so the UV lamp follows the plurality of printheads regardless of whether the first end of the member moves in the first direction or the second direction; and
a controller operatively connected to the plurality of printheads and the plurality of actuators, the controller being configured to operate the at least one actuator operatively connected to the first end of the member to move the first end of the member along the guide rail in the first and the second directions and to move the plurality of printheads along the path opposite the planar member, to operate the plurality of printheads to eject drops of ink toward the planar member as the plurality of printheads move along the path opposite the planar member to form images on objects positioned on the planar member, to operate the at least one actuator operatively connected to the plurality of printheads to rotate the plurality of printheads about the second end of the member to position the printheads in the predetermined order regardless of whether the first end of the member moves in the first direction or the second direction along the guide rail, to operate the UV lamp to cure ejected ink as the plurality of printheads moves along the path opposite the planar member, to operate the at least one actuator operatively connected to the bracket to rotate the bracket in a first direction of rotation after the first end of the member has stopped moving in the first direction along the guide rail, and to operate the at least one actuator operatively connected to the bracket to rotate the bracket in a direction of rotation opposite the first direction of rotation after the first end of the member has stopped moving in the second direction along the guide rail.

2. The printing system of claim 1 further comprising:
an electrical power source;

a switch operatively connected to the electrical power source and the UV lamp; and the controller is operatively connected to the switch, the controller being further configured to operate the switch to connect the UV lamp to the electrical power source selectively.

3. The printing system of claim 2 further comprising:

at least one shaft having a first end and a second end, the first end being operatively connected to at least one actuator in the plurality of actuators and the second end being connected to the planar member; and the controller is operatively connected to the at least one actuator operatively connected to the at least one shaft, the controller being further configured to operate the at least one actuator operatively connected to the at least one shaft to move the planar member bidirectionally along a path that is perpendicular to the first direction and the second direction.

4. The printing system of claim 3, the controller being further configured to:

operate the one actuator operatively connected to the at least one shaft to move the planar member along the path that is perpendicular to the first direction and the second direction after the first end of the member has moved along the guide rail in the first direction and carried the bracket, the plurality of printheads, and the UV lamp in the first direction along the path opposite the planar member to a position where the first end of the member stops to align a different portion of the planar member with the plurality of printheads and the UV lamp.

5. The printing system of claim 4, the controller being further configured to:

operate the at least one actuator operatively connected to the bracket to rotate the bracket while the controller is operating the actuator operatively connected to the shaft to move the planar member along the path that is perpendicular to the first direction and the second direction.

6. The printing system of claim 5 wherein the predetermined order of the printheads in the plurality of printheads positions a printhead that ejects white ink to pass over the planar member before any other printhead in the plurality of printheads.

7. The printing system of claim 5 further comprising:

an image generator operatively connected to the plurality of printheads at a position to enable the image generator to precede the plurality of printheads as the plurality of printheads moves along the guide rail, the image generator being configured to generate image data of the planar member and the objects on the planar member; and the controller is operatively connected to the image generator to receive the image data generated by the image generator, the controller being further configured to identify positions of the objects on the planar member and to use the identified positions to operate the plurality of printheads to form images on the objects as the plurality of printheads moves along the guide rail.

8. A method of operating a printing system comprising:

operating with a controller at least one actuator operatively connected to a first end of a member mounted about a guide rail to move the first end of the member bidirectionally along the guide rail and to move a plurality of printheads along a path opposite a planar member;

operating with the controller the plurality of printheads to eject drops of ink toward the planar member as the plurality of printheads move along the path opposite the planar member to form images on objects positioned on the planar member;

operating with the controller at least one actuator operatively connected to the plurality of printheads to rotate the plurality of printheads about a second end of the member mounted about the guide rail to position the printheads in the predetermined order regardless of which direction the first end of the member moves along the guide rail;

connecting a bracket to the second end of the member, the bracket being configured to rotate about a pin connecting the bracket to the second end of the member;

mounting the plurality of printheads to the bracket;

operating with the controller the at least one actuator operatively connected to the plurality of printheads to rotate the bracket and the plurality of printheads about the pin;

operating with the controller a UV lamp mounted to the bracket and positioned in the predetermined order so the UV lamp follows the plurality of printheads regardless of which direction the first end of the member moves along the path opposite the planar member;

operating with the controller the at least one actuator operatively connected to the bracket to rotate the bracket in a first direction of rotation after the first end of the member has stopped moving in a first direction along the guide rail; and operating with the controller the at least one actuator operatively connected to the bracket to rotate the bracket in a direction of rotation opposite the first direction of rotation after the first end of the member has stopped moving in a second direction that is opposite the first direction along the guide rail.

9. The method of claim 8 further comprising:

operating with the controller a switch operatively connected to an electrical power source and the UV lamp to connect the UV lamp to the electrical power source selectively.

10. The method of claim 9 further comprising:

operating with the controller at least one actuator in the plurality of actuators operatively connected to at least one shaft connected to the planar member to move the planar member bidirectionally along a path that is perpendicular to the first direction and the second direction.

11. The method of claim 10 further comprising:

operating with the controller the one actuator operatively connected to the at least one shaft to move the planar member along the path that is perpendicular to the first direction and the second direction after the first end of the member mounted about the guide rail has moved along the guide rail in the first direction and carried the bracket, the plurality of printheads, and the UV lamp in the first direction along the path opposite the planar member to a position where the first end of the member stops to align a different portion of the planar member with the plurality of printheads and the UV lamp.

12. The method of claim 11 further comprising:

operating with the controller the at least one actuator operatively connected to the bracket to rotate the bracket while the controller is operating the actuator operatively connected to the at least one shaft to move the planar member along the path that is perpendicular to the first direction and the second direction.

13. The method of claim 12 wherein the predetermined order of the printheads in the plurality of printheads positions a printhead that ejects white ink to pass over the planar member before any other printhead in the plurality of printheads.

14. The method of claim 13 further comprising:
generating image data of the planar member and the objects on the planar member with an image generator connected to the plurality of printheads and positioned to precede the plurality of printheads as the plurality of printheads moves along the guide rail; and
identifying with the controller positions of the objects on the planar member using the image data generated by the image generator; and operating with the controller the plurality of printheads to form images on the objects as the plurality of printheads moves along the guide rail using the identified positions.

* * * * *